United States Patent [19]

Osman

[11] Patent Number: 5,629,386
[45] Date of Patent: May 13, 1997

[54] HALOMETHYLATION OF POLYMER

[75] Inventor: Akhtar Osman, Sarnia, Canada

[73] Assignee: Bayer Rubber Inc., Sarnia, Canada

[21] Appl. No.: 450,439

[22] Filed: May 25, 1995

[51] Int. Cl.$^6$ .................... C08F 8/20; C08F 8/24
[52] U.S. Cl. .................. 525/354; 525/333.4; 525/333.5; 525/371
[58] Field of Search ....................... 525/354, 371

[56] References Cited

U.S. PATENT DOCUMENTS

| 4,074,035 | 2/1978 | Powers et al. | 526/185 |
| 5,162,445 | 11/1992 | Powers et al. | 525/333.4 |

OTHER PUBLICATIONS

Sadykhov et al in Chemical Abstracts 71: 50579g 1969 (No month available).
Sadykhov et al in Chemical Abstracts 73: 110361h 1970 (No month available).
Warshawsky et al in British Polymer Journal, 16, 234–238, 1984 (Dec.).
Wright et al in Macromolecules 24, 5879–5880 1991 (No month Available).

*Primary Examiner*—Bernard Lipman
*Attorney, Agent, or Firm*—Joseph C. Gil; Godfried R. Akorli; Noland J. Cheung

[57] ABSTRACT

A process is provided for the halomethylation of the aromatic groups in an isoolefin-vinylidene aromatic monomer polymer by the in situ generation of the halomethylating species formed by the reaction of a methoxy alkoxy methane with a thionyl halide, the halomethylation of the polymer being catalyzed by a Lewis acid.

12 Claims, No Drawings

HALOMETHYLATION OF POLYMER

FIELD OF THE INVENTION

The present invention relates to the modification of copolymers of $C_4$ to $C_7$ isomonoolefins and vinylidene substituted aromatic monomers. More particularly, the present invention relates to a method for introducing the halomethyl functionality into copolymers of $C_4$ to $C_7$ isomonoolefins and vinylidene substituted aromatic monomers.

1. Background of the Invention

Polymers with a saturated hydrocarbon backbone are known to possess good environmental and aging resistance which makes them highly desirable in a variety of applications. Furthermore, rubbery copolymers containing major amounts of a $C_4$ to $C_7$ isomonoolefin and a vinylidene substituted aromatic monomer such as copolymers of isobutylene and styrene are well known and possess low permeability, unique damping properties and low surface energy but are not vulcanizable.

The introduction of small amounts of a reactive moiety as a pendant group such as a benzylic halide on the saturated hydrocarbon backbone or on the aromatic ring would greatly extend the usefulness of these polymers by permitting them to be reacted with or compatibilized with other polymers bearing reactive functional groups by grafting or to be crosslinked by reaction with suitable crosslinking agents.

2. Description of the Prior Art

The copolymerization of isobutylene with halomethylstyrene is disclosed in U.S. Pat. No. 4,074,035 as one means by which a copolymer of isobutylene and a halomethyl styrene may be produced directly. This requires the use of vinylbenzyl chloride and the like as a starting material and utilizes a specified continuous solution process with a solvent or mixed solvent system in which the monomers are soluble under specified conditions. Aside from the need to employ the expensive vinylbenzyl chloride starting material, these processes also have limitations in terms of the quantity of aromatic chloromethyl functionality which can be incorporated without encountering excessive chain branching and gel formation during polymerization and polymer recovery because of the reactivity of the benzylic chlorine under cationic polymerization conditions.

Recently, U.S. Pat. No. 5,162,445 discloses a two step process by which a copolymer of isobutylene and a halomethyl styrene may be obtained. The process involves the copolymerization of isobutylene and para-methylstyrene under cationic polymerization conditions to produce a copolymer containing isobutylene and para-methylstyrene followed by the halogenation of the copolymer in the presence of a free radical initiator. However, this process suffers from the disadvantage that when more than 60 percent of the enchained para-methylstyryl units have been mono-substituted, disubstitution at the para-methyl group can occur.

Sadykhov et al in Chemical Abstracts 71: 50579 g have reported two different methods whereby chloromethyl groups may be substituted on the aromatic rings of polystyrene. One procedure involved treatment of polystyrene with paraformaldehyde and gaseous hydrochloric acid in the presence of anhydrous zinc chloride in a solution of concentrated hydrochloric acid while the other procedure involved the use of chloromethyl methyl ether as the chloromethylating agent and anhydrous zinc chloride as the catalyst. It was stated that the latter procedure was the more effective. Sadykhov et al in Chemical Abstracts 73: 110361h have also reported the chloromethylation of the styrene in a low molecular weight copolymer of isobutylene and styrene using chloromethyl ethyl ether as the chloromethylating agent and anhydrous zinc chloride as the catalyst.

However, while the chloromethylation described above can be carried out using chloromethyl methyl ether or bis-chloromethyl ether, both reagents and in particular bis-chloromethyl ether have been listed as highly carcinogenic by the Occupational Safety and Health Administration. The alternative use of formaldehyde or para formaldehyde in acidic aqueous solutions is ineffective in the case of hydrophobic polymeric materials and is also not safe because bis-chloromethylether is formed.

Warshawsky et al disclose in British Polymer Journal, 16, 234–238, 1984 a synthesis of long chain halomethyl ethers such as chloromethyloctylether that are not volatile and are free of bis-chloromethylether.

Wright et al in Macromolecules 24, 5879–5880 (1991) describe a procedure for the chloromethylation of soluble high molecular weight polystyrene that involves the in situ generation of chloromethyl methylether by reaction of dimethoxymethane with thionyl chloride followed by the addition of a Lewis acid catalyst. It was found that the Lewis acid zinc dichloride works well at 30° C. and at 40° C. while the use of tin tetrachloride as the Lewis acid at 40° C. resulted in gelation within one hour after addition.

SUMMARY OF THE INVENTION

It is an objective of the present invention to provide a process for the halomethylation of a polymer containing a $C_4$ to $C_7$ isomonoolefin and a vinylidene substituted aromatic monomer.

It is a further objective of the present invention to provide a process for the halomethylation of a polymer containing a $C_4$ to $C_7$ isomonoolefin and a vinylidene substituted aromatic monomer wherein the halomethylating agent is generated in situ and there is not a substantial formation of gel.

Accordingly, the present invention provides a process for the preparation of a halogen-containing polymer without the substantial formation of gel by reacting a polymer containing a $C_4$ to $C_7$ isomonoolefin and a vinylidene substituted aromatic monomer selected from styrene and alpha-methylstyrene with a halomethylating agent generated in situ and a Lewis acid whereby a halomethyl group is substituted on the aromatic ring of the vinylidene substituted aromatic monomer in the polymer.

Accordingly the present invention further provides a process for the preparation of a halogen-containing polymer without the substantial formation of gel by reacting a polymer containing a $C_4$ to $C_7$ isomonoolefin and a vinylidene substituted aromatic monomer selected from styrene and alpha-methylstyrene with a halomethylating agent generated in situ which comprises the steps of:

(i) providing in a suitable reaction vessel (a) a solution in an organic solvent of the polymer wherein said polymer contains from about 80 to about 98 weight percent of the $C_4$ to $C_7$ isomonoolefin and from about 20 to about 2 weight percent of the vinylidene substituted aromatic monomer for a total of 100 weight percent and (b) from about $1 \times 10^{-2}$ to about $2 \times 10^{-2}$ mols per gram of polymer of a methoxy alkoxy methane of the general formula $ROCH_2OCH_3$ wherein R is an alkyl group having from 1 to 8 carbon atoms and cooling said solution to about 0° to 20° C., (ii) adding to the solution of step (i) about $2 \times 10^{-3}$ to about $2 \times 10^{-2}$ mols per gram of polymer of a thionyl halide, (iii) cooling said solution of step (ii) to about 0° to 20° C. and adding from about $2 \times 10^{-4}$ to about $8 \times 10^{-3}$ mols per gram of polymer of a Lewis acid optionally dissolved in an organic solvent, (iv) heating the solution from step (iii) to a temperature of from about 45° C. to about 80° C. for a period of from about 3 hours to about 10 hours whereby a portion of the aromatic rings in the vinylidene substituted aromatic monomer in the polymer are halomethylated, and (v) recovering the halogen-containing polymer.

DETAILED DESCRIPTION OF THE INVENTION

It has been found that it is possible to prepare a halogen-containing polymer without the substantial formation of gel by reaction of a polymer containing a isomonoolefin and a vinylidene substituted aromatic monomer with a halomethylating agent generated in situ from inexpensive and commercially available reagents that do not require special techniques for their handling or purification.

The polymer suitable for use in this invention contains a $C_4$ to $C_7$ isomonoolefin, preferably isobutylene, and a vinylidene substituted aromatic monomer selected from styrene and alpha-methylstyrene, styrene being the aromatic monomer of choice. The random $C_4$ to $C_7$ isomonoolefin-vinylidene substituted aromatic monomer polymer, preferably an isobutylene-styrene polymer, contains from about 80 to about 98 weight percent of the $C_4$ to $C_7$ isomonoolefin and from about 20 to about 2 weight percent of the vinylidene substituted aromatic monomer, preferably from about 85 to about 95 weight percent of the $C_4$ to $C_7$ isomonoolefin and from about 15 to about 5 weight percent of the vinylidene substituted aromatic monomer. Such polymers are well known in the art and may be prepared, for example, according to the procedure of U.S. Pat. No. 3,948,868 which comprises the continuous reaction of the monomers in a mixed solvent system comprising a polar organic solvent and a nonpolar nonaromatic hydrocarbon solvent in a well-stirred reactor in the presence of a Friedel-Crafts catalyst.

In the process of this invention the generation of the halomethylating agent in situ is accomplished by the reaction of a methoxy alkoxy methane having the general formula $ROCH_2OCH_3$ with a thionyl halide wherein R is an alkyl group having from 1 to 8 carbon atoms.

The thionyl halide suitable for use is selected from thionyl chloride and thionyl bromide, thionyl chloride being the halide of choice. The thionyl halide is used in an amount of from about $2 \times 10^{-3}$ to about $2 \times 10^{-2}$ mols per gram of the polymer.

Methoxy alkoxy methanes suitable for use in the process of this invention include as representative nonlimiting examples dimethoxymethane, methoxy ethoxymethane, methoxy propoxymethane, methoxy n-butoxymethane, methoxy n-pentoxymethane, methoxy n-heptoxymethane and methoxy n-octoxymethane with dimethoxymethane being preferred. The methoxy alkoxy methane is used in an amount of from about $1 \times 10^{-2}$ to about $2 \times 10^{-2}$ mols per gram of the polymer.

A number of Lewis acids are suitable for use in the process. Representative non-limiting examples include tin tetrachloride, zinc dichloride, titanium tetrachloride, boron trifluoride etherate, aluminum trichloride and ferric chloride. The preferred Lewis acids for use in the process of this invention are tin tetrachloride and zinc dichloride, tin tetrachloride being the most preferred. The Lewis acid is used in an amount of from about $2 \times 10^{-4}$ to about $8 \times 10^{-3}$ mols per gram of polymer. The Lewis acid may optionally be dissolved in a solvent selected from the group consisting of $C_1$ to $C_4$ halogenated hydrocarbons and $C_5$ to $C_{12}$ ethers, preferably chloroform, diethyl ether, tetrahydrofuran and dioxane.

The process according to the present invention is conducted in an organic solvent. Preferably the solvent is selected from the group consisting of chloroform, methylene chloride, chlorobenzene, $C_4$ to $C_6$ cyclic ethers and mixtures thereof, most preferably chloroform, tetrahydrofuran, dioxane and mixtures thereof.

The order of addition of the polymer, the methoxy alkoxy methane, the thionyl halide and the Lewis acid is of importance in the process of the present invention. The polymer is dissolved in a suitable solvent as hereinbefore described and to this polymer solution there is then added the methoxy alkoxy alkane followed by the thionyl halide whereby the halomethylating agent is generated. As hereinbefore described, either both the methoxy alkoxy alkane and the thionyl halide or one of the methoxy alkoxy alkane and the thionyl halide may be added as solutions in suitable solvents. While it is not essential, it is preferable that there is a period of aging of the solution of from about 15 minutes to about 2 hours in order to ensure that formation of the halomethylating agent has gone to completion prior to the addition of the Lewis acid to the solution of polymer and halomethylating agent. Following addition of the Lewis acid, reaction is then allowed to take place for a time of from about 3 hours to about 10 hours whereby halomethylation of a portion of the aromatic rings of the vinylidene substituted aromatic moieties in the polymer occurs and the halogen-containing polymer is subsequently recovered using conventional techniques used to recover rubbery polymer and dried.

Addition of the methoxy alkoxy alkane to the polymer solution may be conducted at ambient temperature but the subsequent addition of the thionyl halide should be carried out at a temperature of from about 0° C. to about 20° C. in order to ensure a slow, steady generation of the halomethylating agent. If the solution of the polymer and the halomethylating agent is aged, the aging process may be conducted at ambient temperature but addition of the Lewis acid, optionally dissolved in a solvent, to the polymer solution is undertaken at a temperature of from about 0° C. to about 20° C. Reaction of the polymer with the halogenating agent in the presence of the Lewis acid is then conducted at a temperature of from about 45° C. to about 80° C.

Evidence for the substitution of the halomethyl group on some of the aromatic rings of the vinylidene substituted aromatic moieties in the polymer is afforded by NMR spectroscopy. The 200 $MH_z$ $^1H$ NMR spectrum of the product obtained upon chloromethylation of an isobutylene-styrene polymer exhibits a triplet at 4.47 δ (ppm) attributable to the two benzylic protons —Ar—$\underline{CH_2}$—Cl which are attached to the same carbon atom as the chlorine atom. In a like manner, 200 $MH_z$ $^1H$ NMR spectroscopy provides evidence for the introduction of the bromomethyl group into a isobutylene-styrene polymer in that the spectrum exhibits a triplet at 4.47 δ (ppm) attributable to the two benzylic protons —Ar—$\underline{CH_2}$—Br attached to the same carbon atom as the bromine atom.

In a preferred embodiment of the present process, a chloromethylated polymer is prepared, wherein an isobutylene-styrene polymer was dissolved in chloroform and dimethoxymethane in an amount of from about $1 \times 10^{-2}$ to about $2 \times 10^{-2}$ mols per gram of the polymer added in a suitable reaction vessel under a blanket of nitrogen. The solution was cooled to about 10° C. and thionyl chloride in an amount of from about $2\times10^{-3}$ to about $2\times10^{-2}$ mols per gram of the polymer was added to the solution which was then permitted to age for 45 minutes at ambient temperature. After the temperature of the solution had been reduced to 10° C., tin tetrachloride in amount of from about $5\times10^{-4}$ to about $5\times10^{-3}$ mols per gram of polymer was added and the solution heated to a temperature of about 60° C. for 4.5 hours, at the end of which time the polymer was coagulated by the addition of methanol and subsequently dried. The polymer was found to be completely soluble in hexane indicating gel had not been formed and analysis of the polymer by 200 $MH_z$ $^1H$ NMR spectroscopy revealed that chloromethyl groups had been introduced into the aromatic rings of the styrene moieties in the polymer to the extent of 1.8 mol percent.

The polymers of the present invention may be compounded and vulcanized using the techniques well known in the art for the halogenated butyl rubbers (bromobutyl and chlorobutyl). Such vulcanizates may be used in numerous applications such as where gas impermeability, damping characteristics and good aging are required including in tire applications, hoses and shock absorbing applications.

The following examples illustrate the present invention and are not intended to limit the scope therof.

MATERIALS

Pure styrene was dried by passage through a column of activated silica gel and a column of activated neutral aluminum. High purity methyl chloride was dried by passing the gas through a column of semi-granular barium oxide and condensing it in an inert and dry atmosphere in a stainless-steel dry box at a temperature of −85° C.

An anhydrous aluminum chloride solution was prepared by dissolving anhydrous aluminum chloride (3.0 gm) in methyl chloride (100 ml) with vigorous shaking and the resultant solution was maintained at a temperature of approximately −85° C.

Dimethoxymethane, chloroform, thionyl chloride, thionyl bromide, tin tetrachloride and 1,1,1-trichlorethane were used as received.

EXPERIMENTAL

The molecular weight distribution of the product polymer was determined using a Waters gel permeation chromatographic instrument equipped with six Ultrastyragel ® columns connected in series having pore sizes of 100, 500, $10^3$, $10^4$, $10^5$ and $10^6$ Angstrom respectively maintained at a temperature of 35° C. and two detectors, a differential refractive index detector 410 and an ultraviolet spectrophotometer 484.

Tetrahydrofuran was used as the mobile phase at a flow rate of 1 ml per minute. The instrument was calibrated with polystyrene standards having a narrow molecular weight distribution and sulphur was used as the internal reference. Both the weight average molecular weight ($M_w$) and the number average molecular weight ($M_n$) were calculated using Water's Maxima 820 gel permeation chromatographic software and the universal calibration principle.

The styrene content and the halomethyl modified styrene content in the polymers was determined by 200 $MH_z$ nuclear magnetic spectroscopy.

EXAMPLE 1

A copolymer of isobutylene and styrene was prepared in the following manner.

Isobutylene (30.0 gm, 0.54 mol), styrene (3.0 gm, 0.029 mol), methyl chloride (200 ml) and n-hexane (200 ml) were introduced under a dry nitrogen atmosphere in a dry-box into a 3-necked one liter round bottom flask equipped with a mechanical stirrer and the temperature of the resultant solution reduced to −100° C. Anhydrous aluminum chloride solution (3% wt./volume, 3.0 ml) was then added and polymerization allowed to proceed for 3.5 hours after which time the polymerization was stopped by the addition of 20 ml of prechilled methanol. The methyl chloride was flashed off, the polymer was coagulated with methanol, redissolved in n-hexane and then recoagulated with acetone. The polymer thus isolated was dried overnight in a vacuum oven at a temperature of 60° C. By gel permeation chromatography, the molecular weight was $M_n$ 95,850, $M_w$ 245,380 and $^1H$ NMR (200 $MH_z$) showed that the polymer contained 94.4 mol isobutylene and 5.6 mol % styrene.

EXAMPLE 2

A solution of the polymer produced in Example 1 (10 gm) was dissolved in chloroform (300 ml), placed in a 3-necked 500 ml round bottom flask equipped with a mechanical stirrer and covered with a blanket of nitrogen. After the addition of dimethoxymethane (12.5 ml, 0.14 mol) the solution was cooled to 0° C. and thionyl chloride (5.25 ml, 0.07 mol) was added and the solution was allowed to warm to ambient temperature. After 45 minutes stirring, the solution was again cooled to 0° C. tin tetrachloride (1 ml, $8.5\times10^{-3}$ mol) was added and the reaction mixture was heated to a temperature of 47° C. for 7 hours, samples of the reaction mixture being taken every 2 hours. The samples of the polymer were isolated by coagulation with prechilled methanol and then dried in a vacuum oven at a temperature of 60° C. overnight. The polymer was completely soluble in chloroform. The samples were analyzed by $^1H$ NMR spectroscopy (200 $MH_z$, $CDCl_3$): 0 hrs; (7.2–7.4 δ, Ar—H) aromatic 5.6 mol % styrene; 2 hrs (7.2–7.4 δ, m, 5 H) 5.6 mol % styrene; 4 hrs (4.8 benzylic chloride, 4.9 mol % styrene; 6 hrs (4.4 δ, t 2—ArCH$_2$—Cl); 1.7 mol % benzylic chloride, 3.9 mol % styrene.

EXAMPLE 3

A sample (11 gm) of a polymer (93.6 mol % isobutylene, 6.4 mol % styrene) was dissolved in dry chloroform (300 ml) the solution placed in a 3 necked 1 liter round bottom flask equipped with a mechanical stirrer and a condenser and purged with nitrogen. After the addition of dimethoxymethane (13 ml, $1.47\times10^{-1}$ mol), the solution was cooled to 0° C. and thionyl chloride (5.5 ml, $7.54\times10^{-2}$ mol) was added and the solution was allowed to warm to ambient temperature. After 45 minutes stirring, the solution was again cooled to 0° C. tin tetrachloride (15 ml, $1.28\times10^{-2}$ mol) was added and the reaction mixture was heated to a temperature of 65° C. for 4.5 hours, samples of the reaction mixture being taken after 2.5 hours and 4.5 hours. The samples were isolated and dried according to the procedure of Example 2. The polymer was completely soluble in chloroform. Analysis by $^1H$ NMR spectroscopy (200 $MH_z$, $CDCl_3$) 0 hrs. (7.2–7.4 δ,m Ar—H) 6.4 mol % styrene; 2.5 hours (4.7 δ, t, 2—ArCH$_2$—Cl), (7.2–7.5 δ, m, Ar—H); 0.8 mol % benzylic chloride, 5.6 mol % styrene; 4.5 hours (4.8 δ, t, 2—Ar—CH$_2$—Cl), (7.2–7.5 δ, m, Ar—H); 1.8 mol % benzylic chloride, 4.2 mol % styrene. At the more elevated temperature (65° C. as compared to 47° C.) substitution of chloromethyl groups on the styrene moieties in the polymer takes place more rapidly.

EXAMPLE 4

Introduction of a bromomethyl group into the polymer was also carried out. The reaction was conducted using the procedure of Example 3 with the exception that thionyl bromide (9.0 ml, 1.16×10⁻¹ mol) was used instead of thionyl chloride, and the duration of the reaction was 8 hours, samples being taken every 2 hours. Analysis by $^1$H NMR spectroscopy (200 MH$_z$, CDCl$_3$). 0 hrs (7.2–7.4 δ, m, Ar—H) 6.4 mol % styrene; 2 hrs. (4.5 δ, t, Ar—CH$_2$—Br) 0.2 mol % benzylic bromide; (7.2–7.5 δ, m, Ar—H) 6.2 mol % styrene; 4 hrs. (4.47 δ, t, ArCH$_2$13 Br) 0.3 mol % benzylic bromide; (7.2–7.5 δ, m, Ar—H) 6.1 mol % styrene; 6 hrs. (4.47 δ, t, ArCH$_2$—Br) 0.5 mol % benzylic bromide; (7.2–7.5 δ, m, Ar—H) 5.9 mol % styrene; 8 hrs. 4.48 δ, t, Ar—CH$_2$—Br) 0.8 mol % benzylic bromide; (7.1–7.4 δ, m, Ar—H) 5.6 mol % styrene. There was no evidence of gel in the polymer.

Two chloromethylation reactions were carried out.

EXAMPLE 5

(Control)

A sample (10 gm) of a polymer (93.6 mol % isobutylene, 6.4 mol % styrene) was dissolved in dry 1,1,1-trichloroethane (250 ml), in a 3-necked 500 ml round bottom flask equipped with a mechanical stirrer and condenser and the solution purged with nitrogen. To a separate 2-necked 100 ml round bottom flask equipped with a magnetic stirrer, there was added dimethoxymethane (25 ml, 2.82×10⁻¹ mol), followed by thionyl chloride (10.5 ml, 1.44×10⁻¹ mol) and the solution was then stirred for 1 hour at ambient temperature while being purged with nitrogen and then was added to the polymer solution. Tin tetrachloride (1.5 ml, 1.28×10⁻² mol) was then added and the reaction mixture was then heated at a temperature of 70° C. overnight under a blanket of nitrogen. Prechilled methanol was then added to the solution in order to coagulate the copolymer which was subsequently redissolved in 1,1,1-trichloroethane and reco-agulated with methanol. The resultant product was found to contain a large amount of gel.

EXAMPLE 6

(Control)

A sample (10 gm) of a polymer (93.6 mol % isobutylene, 6.4 mol % styrene) was dissolved in dry 1,1,1-trichloroethane in a 3-necked 500 ml round bottom flask equipped with a mechanical stirrer and condenser, purged with nitrogen and dimethoxymethane (25 ml, 2.82×10⁻¹ mol) slowly added to the solution maintained at a temperature of 0° C. The solution was allowed to warm to ambient temperature for 1 hour and then tin tetrachloride (1.5 ml, 1.28×10⁻² mol) was added and the reaction mixture heated at a temperature of 75° for 8 hours under a blanket of nitrogen. The polymer was then isolated according to the procedure used in Example 5. Once again the product obtained was found to contain a large amount of gel. Examples 5 and 6 demonstrate that the use of a highly chlorinated hydrocarbon such as 1,1,1-trichloroethane as the solvent in conjunction with the Lewis acid tin tetrachloride for the chloromethylation of the polymer at a more elevated temperature yields a product which contains a substantial amount of gel.

EXAMPLE 7

The polymers produced in Examples 2 and 4 were compounded and vulcanized. The compounding recipe (all parts by weight) was, for 100 parts of polymer, 40 parts of carbon black, 15 parts of paraffinic oil, 1 part of stearic acid, 5 parts of zinc oxide, 1 part of tetramethyl thiuram disulphide and 2 parts of benzothiazyl disulphide. A commercially available bromobutyl and chlorobutyl polymers were similarly compounded for use as controls. The compounds were evaluated in a Monsanto rheometer at a temperature of 165° C. using a 3° arc. After 20 minutes of test time, the polymers of Examples 2 and 4 showed similar torque values to the controls.

What is claimed is:

1. A process for the preparation of a halogen-containing polymer without the substantial formation of gel by reacting a polymer containing a $C_4$ to $C_7$ isomonoolefin and a vinylidene substituted aromatic monomer selected from styrene and alpha-methylstyrene with a halomethylating agent generated in situ which comprise the step of:

(i) providing in a suitable reaction vessel (a) a solution in an organic solvent of the polymer wherein said polymer contains from about 80 to about 98 weight percent of the $C_4$ to $C_7$ isomonoolefin and from about 20 to about 2 weight percent of the vinylidene substituted aromatic monomer for a total of 100 weight percent and (b) from about 1×10⁻² to about 2×10⁻² mols per gram of polymer of a methoxy alkoxy methane of the general formula ROCH$_2$OCH$_3$ wherein R is an alkyl group having from 1 to 8 carbon atoms and cooling said solution to about 0° to 20° C., (ii) adding to the solution of step (i) from about 2×10⁻³ to about 2×10⁻² mols per gram of polymer of a thionyl halide, (iii) cooling said solution of step (ii) to about 0° to about 20° C. and adding from about 5×10⁻⁴ to about 5×10⁻³ mols per gram of polymer of Lewis acid optionally dissolved in an organic solvent, (iv) heating the solution from step (iii) to a temperature of from about 45° C. to about 80° C. for a period of from about 3 hours to about 10 hours whereby a portion of the aromatic rings in the vinylidene substituted aromatic monomer in the polymer are halomethylated, and, (v) recovering the halogen-containing polymer.

2. The process of claim 1 wherein the vinylidene substituted aromatic monomer is styrene.

3. The process of claim 1 wherein the organic solvent of step (i) is selected from the group consisting of chloroform, methylene chloride, chlorobenzene and $C_4$ to $C_6$ cyclic ethers.

4. The process of claim 3 wherein the organic solvent is selected from chloroform, tetrahydrofuran and dioxane.

5. The process of claim 1 wherein the Lewis acid is selected from the group consisting of tin tetrachloride, zinc dichloride, titanium tetrachloride, boron trifluoride etherate, aluminum trichloride and ferric trichloride.

6. The process of claim 5 wherein the Lewis acid is selected from tin tetrachloride and zinc dichloride.

7. The process of claim 6 wherein the Lewis acid is tin tetrachloride.

8. The process of claim 1 wherein the thionyl halide is selected from thionyl bromide and thionyl chloride.

9. The process of claim 8 wherein the thionyl halide is thionyl chloride.

10. The process of claim 1 wherein the solution of step (ii) is aged for a period of from about 15 minutes to about 3 hours prior to addition of the Lewis acid.

11. The process of claim 1 wherein the methoxy alkoxy methane is selected from the group consisting of dimethoxy methane, methoxy ethoxy methane and methoxy propoxymethane.

12. A process for the preparation of a chlorine-containing polymer without the substantial formation of gel by reacting a polymer containing isobutylene and styrene with a chloromethylating agent generated in situ which comprises the steps of:

(i) providing in a suitable reaction vessel (a) a solution of the polymer in an organic solvent selected from chloroform, chlorobenzene, $C_4$ to $C_6$ cyclic ethers and mixtures thereof wherein said polymer contains from about 80 to about 98 weight percent of isobutylene and from about 20 to about 2 weight percent of styrene monomer based on the total of the isobutylene and styrene in the polymer and (b) from about $1\times10^{-2}$ to about $2\times10^{-2}$ mols per gram of polymer of dimethoxymethane, and cooling said solution to about 0° to about 20° C., (ii) adding to the solution of step (i) from about $2\times10^{-3}$ to about $2\times10^{-2}$ mols per gram of polymer of thionyl chloride and allowing the mixture to age for about 15 minutes to about 3 hours, (iii) cooling said solution of step (ii) to about 0° to about 20° and adding about $5\times10^{-4}$ to about $5\times10^{-3}$ mols of tin tetrachloride per gram of polymer optionally dissolved in an organic solvent, (iv) heating the solution from step (iii) to a temperature of from about 45° C. to about 80° C.

for a period of from about 3 hours to about 10 hours whereby a portion of the aromatic rings in the styrene monomer are chloromethylated, and (v) recovering the chlorine-containing polymer.

* * * * *